United States Patent [19]

Haka

[11] Patent Number: 5,895,335
[45] Date of Patent: Apr. 20, 1999

[54] CONTINUOUSLY VARIABLE POWERTRAIN

[75] Inventor: Raymond James Haka, Brighton, Mich.

[73] Assignee: General Motors Corporation, Detroit, Mich.

[21] Appl. No.: 09/027,299

[22] Filed: Feb. 20, 1998

[51] Int. Cl.$^6$ ........................................ F16H 9/26
[52] U.S. Cl. ............................................... 475/210
[58] Field of Search ............................. 475/207, 210, 475/213, 214, 215

[56] References Cited

U.S. PATENT DOCUMENTS

| | | | |
|---|---|---|---|
| 4,467,670 | 8/1984 | Kawamoto | 475/210 X |
| 4,550,629 | 11/1985 | Kawamoto | 475/210 |
| 5,607,371 | 3/1997 | Yamaguchi | 475/210 |

*Primary Examiner*—Charles A Marmor
*Assistant Examiner*—Sherry Lynn Estremsky
*Attorney, Agent, or Firm*—Donald F. Scherer; Michael J. Bridges

[57] ABSTRACT

A continuously variable transmission (CVT) of the variable belt (CVU) type provides a variable drive range. A simple planetary gearset disposed between a power source and the CVU provides a forward direct ratio and a reverse underdrive ratio. The CVT is controlled at a lower overall ratio determined by the diameter of the input sheave being controlled during the forward drive condition at a dimension M. During the reverse drive condition, the diameter of the input sheave is maintained at a larger diameter (M*R) where R is the reverse underdrive ratio of the planetary.

2 Claims, 1 Drawing Sheet

CONTINUOUSLY VARIABLE POWERTRAIN

TECHNICAL FIELD

This invention relates to continuously variable transmissions disposed within a powertrain.

BACKGROUND OF THE INVENTION

Continuously variable transmissions (CVT) of the variable ratio belt type (CVU) include a planetary gearset which provides reversing operation. The planetary gearset is positioned upstream, in a power flow direction, of the friction belt. This reduces the torque capacity requirement of the planetary gearset which reduces the weight and size thereof.

There is, however, a disadvantage to placing the reversing operation upstream of the CVU. A negative one (−1) ratio cannot be attained with a simple planetary gearset. If the planetary ratio during reversing operation is greater than unity, the belt tension in the CVU can exceed maximum design criteria or the input torque must be reduced (i.e., the engine output and/or torque converter ratio is limited). Thus, a compound (double pinion) planetary gearset is used to establish the reverse operation. This increases the complexity and cost of the planetary gearset.

In most current automatic shifting transmissions, the reverse torque, by design, is approximately 70% of the low forward ratio, while in CVTs, the reverse torque is approximately 80% of the low forward ratio. During reverse operation, the CVU is usually maintained at a fixed underdrive ratio in most CVT mechanisms.

SUMMARY OF THE INVENTION

It is an object of the present invention to provide an improved continuously variable transmission (CVT) of the variable belt and sheave (CVU) type.

In one aspect of the invention, a simple planetary gearset is placed between a power source and the CVU to provide a reverse ratio at the input of the CVU.

In another aspect of the invention, the belt of the CVU is positioned on the sheaves such that a minimum diameter of the input sheave is increased during reverse operation when compared to forward operation.

In yet another aspect of the invention, the minimum diameter of the input sheave during reverse operation is increased relative to the forward operation by a multiple of the reverse ratio of the simple planetary gearset.

In a further aspect of the invention, the minimum diameter of the input sheave is limited to a first value during forward operation and at a higher value in the reverse operation to maintain the maximum belt tension in reverse at or below the maximum belt tension in forward.

DESCRIPTION OF AN EXEMPLARY EMBODIMENT

Figure 1:
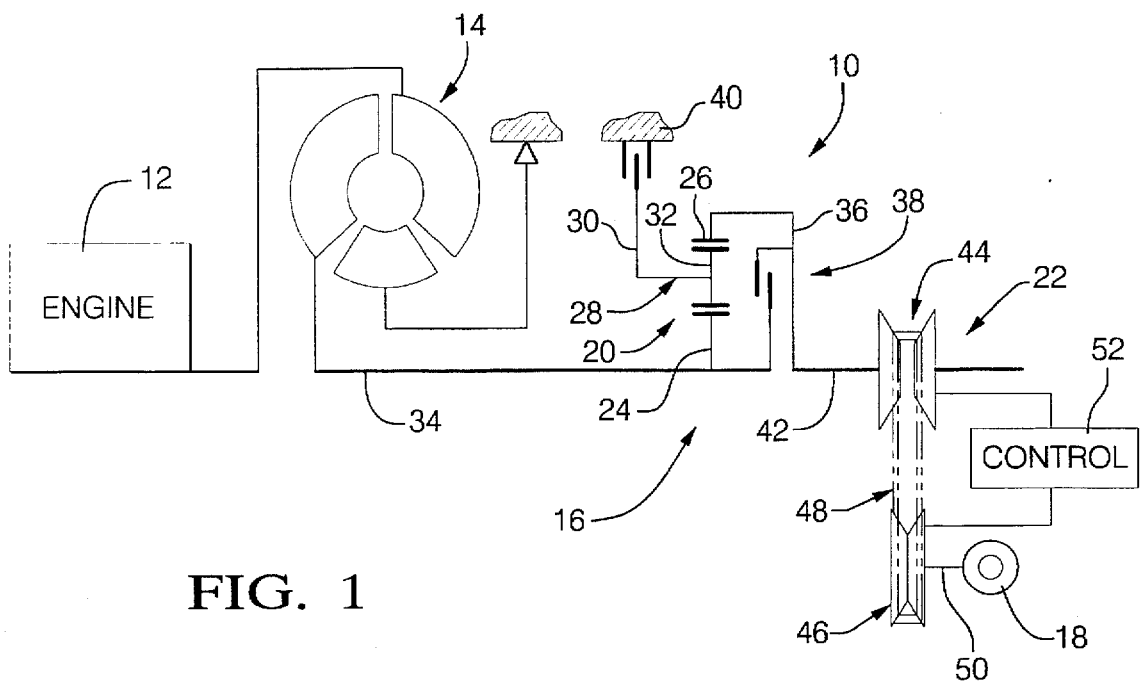
FIG. 1 is a schematic representation of a powertrain incorporating the present invention.
Figure 2:
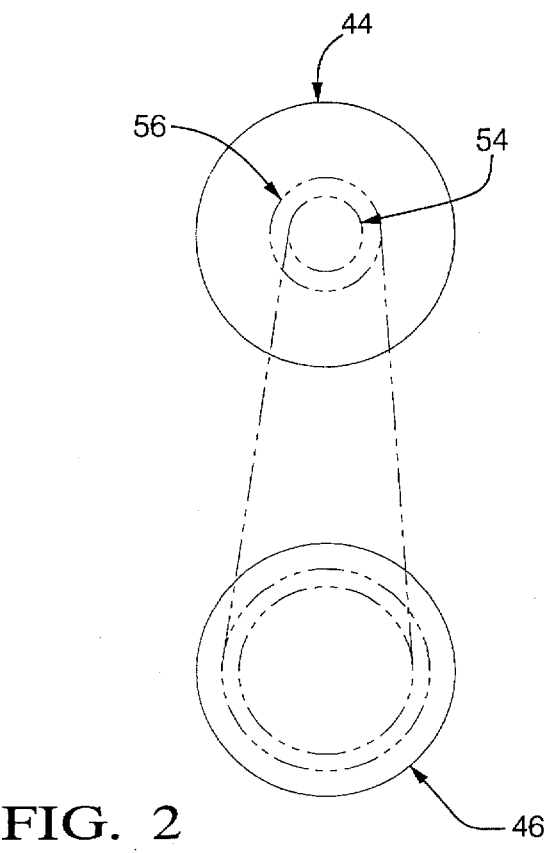
FIG. 2 is a diagrammatic representation depicting the belt and sheaves of the powertrain of FIG. 1.

Referring to the drawings, there is seen a powertrain generally designated 10 having an engine 12, a torque converter 14, a continuously variable transmission (CVT) 16 and a conventional differential 18. The CVT 16 is comprised of a planetary gearset 20 and a continuously variable drive unit (CVU) 22.

The planetary gearset 20 includes a sun gear 24, a ring gear 26 and a carrier assembly 28. The carrier assembly includes a carrier spider 30 rotatably mounting a plurality of pinion gears 32. The torque converter 14 includes an impeller (I) driven by the engine 12, a turbine (T) adapted to deliver power through a planetary input shaft 34 and a stator (S) which provides the torque multiplication of the torque converter 14 in a well known manner. The planetary input shaft 34 is drivingly connected with the sun gear 24 of the planetary gearset 20.

The ring gear 26 has a hub portion 36 which provides a partial housing for a clutch 38. The clutch 38, when engaged, permits the sun gear 24 to be connected with the ring gear 26 by providing a direct drive ratio in the planetary gearset 20. The carrier assembly 28 is operatively connected with the conventional multiple disc fluid operated brake 40 which, when actuated or engaged, will hold the carrier assembly 28 stationary thereby providing a reverse ratio between the sun gear 24 and the ring gear 26.

Both the clutch 38 and brake 40 are conventional fluid operated friction devices which are constructed in a well known manner and are known to those skilled in the art of power transmissions. The hub 36 is connected to a CVU input shaft 42 which in turn is connected with an input sheave or pulley 44 of the CVU 22. The CVU 22 also has an output sheave or pulley 46 which is interconnected with the input sheave 44 by a belt or chain 48. The chain 48 is constructed in a well known manner of a plurality of steel blocks held together by multiple steel bands. The belt 48 is maintained in tension between the sheaves 44 and 46, such that a friction drive obtained in a well known manner between the sheaves 44 and 46.

The sheaves 44 and 46 each have one movable side sheave and one fixed side sheave such that the operating diameter of the belt 48 can be adjusted between the input sheave 44 and the output sheave 46 thereby changing the ratio between the input shaft 34 and an output shaft 50 which is connected with the conventional differential 18. The diameter of the sheaves 44 and 46 is controlled in a well known manner by a conventional electrohydraulic control 52 which may include an electronic processor or digital computer in combination with a hydraulic control system in a hydraulic pump. These systems are well known, such that a more complete description is not believed necessary for those skilled in the art to understand the operation of the CVU 22.

When the planetary gearset 20 is placed in direct drive through the engagement of clutch 38, the input sheave 44 is adjusted by the control 52 such that a minimum forward radius 54 is attained. As is the general rule in the controls for CVUs, the output sheave 46 is controlled in response to the movement of the input sheave 44. In other words, the input sheave 44 is pressurized sufficiently to cause the pulleys to obtain the desired diameter and the tension on the belt 48 as well as the pressure applied to the sheave 46 will permit the output sheave to be adjusted and thereby provide the proper operating diameter. With the minimum forward radius 54 set in the input sheave 44, an overall ratio is established in the CVU 22.

When the clutch 38 is disengaged and the brake 40 is engaged, a reverse ratio is established in the planetary gearset 20 thereby providing a negative or reversing input at the shaft 42. Since the planetary gearset 20 in reverse provides an underdrive ratio, the output torque at the ring gear 26 is considerably greater than the input torque at the sun gear 24. For example, the sun gear 24 might rotate at a speed of 1.5 times greater or faster than the ring gear 26 resulting in a torque multiplication of 1.5 at the ring gear 26.

Thus, the torque input at the sheave 44 is higher than that which is present at the sheave during forward drive.

The belt 48 requires a tension which is sufficient to transmit the input torque at sheave 44 to the output sheave 46. The higher the torque at the input sheave 44, the higher the belt tension. Since it is desirable to maintain the belt tension at a maximum design level during the low forward ratio, the reverse ratio should attain the same or less belt tension. In order to accomplish this, the minimum radius in sheave 44 is adjusted outwardly to the position 56 thereby increasing the drive diameter at sheave 44 such that the belt tension is reduced. Those skilled in the art will recognize that the torque input is related to belt tension by the radius at which the belt operates. In other words, if the same input torque is applied during forward and reverse, the outward or increased radius at the input sheave 44 will result in a reduced belt tension. However, due to the fact that the input torque at the sheave 44 is multiplied or increased for the reverse operation, the radius 56 established during reverse will result in the belt tension being substantially the same in reverse as it is in forward.

The following numbers for radius and ratio within the CVU 22 are given by way of example and are not meant to be limiting. In a conventional CVU, the minimum drive radius in the low forward range might be 33.23 mm and the radius at the output sheave 46 is 81.38 mm, resulting in an underdrive ratio within the CVU of 2.45. When the reverse operation is established, the minimum radius at the sheave 44 is set at 49.9 mm which is 1.5 times the radius in the low forward range. With the radius of the input sheave set at 49.9 mm, the output sheave will be set at 71.44 mm resulting in a reverse underdrive ratio of 1.43. Thus, it can be seen that the reverse ratio is less than the maximum underdrive ratio in forward. However, it must be remembered that the input torque is 1.5 times greater during reverse. This results in an overall ratio from the planetary input shaft 34 to the output shaft 50 of 2.145. This will result in a forward to reverse ratio of 0.875. In other words, the maximum reverse torque ratio is 87½% of the forward torque ratio.

Those skilled in the art will recognize that this well within the realm of conventional CVT design statistics. It will also be appreciated that this is accomplished using a simple planetary gear arrangement, that is a sun gear, a ring gear and a single set of pinion gears meshing between the sun and ring gear. This is the least expensive and most common type of planetary gearset.

Also, the gearset is placed on the input side of the CVU thereby reducing the torque requirement necessary for the planetary gearset, thus further reducing the size and cost of manufacture of this gear unit. The ratio utilized in planetary gearset 20 can be varied within the realm of conventional design practice and it will be appreciated that the input sheave diameter will also be adjusted accordingly.

I claim:

1. A continuously variable powertrain having forward drive range and reverse drive ratio comprising:

a simple planetary gearset having a sun gear member, a ring gear member, and a planetary carrier assembly member including a plurality of pinion gears meshing with said sun gear and said ring gear;

a selectively engageable friction clutch for selectively interconnecting two of said members of said planetary gearset during the forward drive range to establish a direct drive ratio in said planetary gearset;

a selectively engageable brake for selectively holding said carrier member stationary during the reverse ratio to establish a reverse ratio equal to R between said sun gear member and said ring gear member;

an input drive member connected to said sun gear to direct input power to said sun gear member;

a continuously variable friction belt drive mechanism having an input sheave, an output sheave and a flexible belt trained around said sheaves at a minimum forward drive radius of M at said input sheave during a lowest forward ratio in the forward drive range and at a minimum reverse drive radius of M*R at said input sheave during the reverse ratio; and a driven member connected between said ring gear and said input sheave of said continuously variable friction belt drive mechanism.

2. A continuously variable powertrain having forward drive range and reverse drive ratio comprising:

a simple planetary gearset having a sun gear member, a ring gear member, and a planetary carrier assembly member including a plurality of pinion gears meshing with said sun gear and said ring gear;

an input drive member connected to said sun gear to direct input power to said sun gear member;

a driven member connected between said ring gear and an input sheave of a continuously variable friction belt drive mechanism;

a selectively engageable friction clutch for selectively interconnecting said input drive member with said driven member;

a selectively engageable brake for selectively holding said carrier member stationary to establish a reverse ratio equal to R between said sun gear member and said ring gear member; and said continuously variable friction belt drive mechanism including said input sheave, an output sheave and a flexible belt trained around said sheaves at a minimum forward drive radius of M at said input sheave during a lowest forward ratio in the forward drive range and at a minimum reverse drive radius of M*R at said input sheave during the reverse ratio.

* * * * *